United States Patent [19]

Uchiyama

[11] Patent Number: 4,872,061
[45] Date of Patent: Oct. 3, 1989

[54] FACSIMILE

[75] Inventor: Masahiro Uchiyama, Shizuoka, Japan

[73] Assignee: Tokyo Electric Co., Ltd., Tokyo, Japan

[21] Appl. No.: 216,855

[22] Filed: Jul. 8, 1988

[30] Foreign Application Priority Data

| Jul. 13, 1987 | [JP] | Japan | 62-174131 |
| Jul. 13, 1987 | [JP] | Japan | 62-174132 |
| Jul. 13, 1987 | [JP] | Japan | 62-174133 |
| Aug. 28, 1987 | [JP] | Japan | 62-214333 |

[51] Int. Cl.⁴ .............................................. H04N 1/40
[52] U.S. Cl. ...................................... 358/400; 358/474
[58] Field of Search ................ 358/296, 256, 290, 285

[56] References Cited

U.S. PATENT DOCUMENTS

| 4,475,128 | 10/1984 | Koumura | 358/293 |
| 4,630,123 | 12/1986 | Kadomatsu | 358/256 |
| 4,651,224 | 3/1987 | Watanabe | 358/285 |
| 4,667,252 | 5/1987 | Nakamura | 358/256 |
| 4,684,999 | 8/1987 | Sakakibara | 358/256 |
| 4,734,788 | 3/1988 | Emmett | 358/296 |
| 4,743,976 | 5/1988 | Katakabe | 358/293 |
| 4,751,582 | 6/1988 | Koseki | 358/256 |
| 4,768,100 | 8/1988 | Kunishima | 358/285 |

FOREIGN PATENT DOCUMENTS

| 0113572 | 6/1985 | Japan | 358/285 |
| 61-148953 | 7/1986 | Japan | . |

Primary Examiner—Edward L. Coles, Sr.
Assistant Examiner—Jerome Grant, II
Attorney, Agent, or Firm—Frishauf, Holtz, Goodman & Woodward

[57] ABSTRACT

A facsimile includes a body cover, a U-turn feed unit contained in the body cover and having a turnabout roller for changing an original-sheet feed direction, a reading sensor contained in the body cover to read an image on an original sheet transported in the U-turn feed unit, and an image recording unit contained in the body cover to record an image on a recording sheet. The reading sensor is situated at a position within a space surrounded by a U-turn feed path in the U-turn feed unit such that the reading sensor cannot interfere with the turnabout roller.

15 Claims, 7 Drawing Sheets

FACSIMILE

BACKGROUND OF THE INVENTION

1. Field of the Invention

The present invention relates to a facsimile which comprises a body cover, U-turn feed means contained in the body cover and having a turnabout roller for changing an original-sheet feed direction, a reading sensor contained in the body cover to read an image (e.g., figures, characters, symbols, drawings, etc.) on an original sheet transported in the U-turn feed means, and image recording means contained in the body cover to record an image on a recording sheet.

2. Description of the Related Art

A facsimile of this type is disclosed in Japanese Patent Disclosure No. 61-148953. This facsimile has a substantially wedge-shaped body cover. In the inside space of the body cover, a recording-sheet storage space for storing a rolled recording sheet is defined at its rear end portion which is taller than any other portions in the inside space of the body cover. Image recording means, an image reading sensor, and U-turn feed means are disposed successively inside the body cover, ranging from the recording-sheet storage space to the front end portion which is shortest in height. A recording-sheet outlet slot and an outlet (original-sheet outlet slot) of a U-turn feed path in the U-turn feed means open in the top surface of the body cover, while an inlet (original-sheet inlet slot) of the U-turn feed path opens to the lower portion in the front surface of the body cover.

In the prior art facsimile described above, the image reading sensor is constructed so as to read the image on the original sheet on a turnabout roller in the U-turn feed means, from the outside of the U-turn feed path, and is attached to a chassis in the body cover to be in an inclined state. In such inclined mounting, accurate setting of the inclination angle requires a troublesome work, thus complicating the assembling work for the convention facsimile. Also, the space surrounded by the U-turn feed path of the U-turn feed means, which externally faces the image reading sensor, is a dead space.

In the aforementioned prior art facsimile, moreover, if trays are provided individually for the original-sheet inlet slot, original-sheet outlet slot, and recording-sheet outlet slot, the tray (original-sheet supply tray) corresponding to the original-sheet inlet slot projects forward from the front surface of the body cover. Thus, the installation space of the conventional facsimile must include the space for installation of the original-sheet supply tray, as well as that for the body cover. Even if the original-sheet inlet tray is not used, the original sheet inserted in the original-sheet inlet slot must be supported horizontally on the top surface of a desk or the like, on which the facsimile is placed, until the original sheet is fully drawn into the body cover. In consequence, a relatively large installation space is required of the top surface of the desk, besides that for the body cover.

In the conventional facsimile described above, furthermore, the recording-sheet storage space, image recording means, and image reading sensor are disposed successively in the inside space of the body cover, ranging from the rear portion thereof to the front portion. Since the outer size of the image recording means is small, a relative large dead space is produced under the image recording means, i.e., between the recording-sheet storage space and the image recording means, inside the body cover.

In the aforementioned prior art facsimile, moreover, a recorded portion of the recording sheet, on which the image has been recorded by means of the image recording means, is cut off from an unrecorded portion by means of a cutter located at the recording-sheet outlet slot in the top surface of the body cover. Thereafter, the recorded portion is discharged onto a tray, which is attached substantially horizontally to the recording-sheet outlet slot, or the forwardly declining top surface of the body cover. The cut recorded portion of the recording sheet may be curled up, due to residual stress attributable to the rolled configuration for the storage in the recording-sheet storage space, or other causes. The recorded portion, curled on the tray or the top surface of the body cover, is a hindrance to the next recorded portion of the recording sheet being discharged from the recording-sheet outlet slot.

SUMMARY OF THE INVENTION

The present invention has been contrived in consideration of these circumstances, and its first object is to provide a facsimile which permits reduction of the mounting space for U-turn feed means and an image reading sensor used in combination therewith, and facilitates the mounting work for the reading sensor, thereby permitting reduction of its general size and facilitating its assembling work.

The above first object of the invention is achieved by a facsimile which comprises: a body cover; U-turn feed means contained in the body cover and having a turnabout roller for changing an original-sheet feed direction; a reading sensor in the body cover to read an image on an original-sheet transported in the U-turn feed means; and image recording means in the body cover to record an image on a recording sheet, the reading sensor being situated at a position within a space surrounded by a U-turn feed path in the U-turn feed means such that the reading sensor cannot interfere with the turnabout roller.

Preferably, in the facsimile described above, the reading sensor is of a contact-type reading sensor adapted to read the image on the original sheet by coming into intimate contact with the original sheet being transported through the U-turn feed path, and the facsimile further comprises an original-sheet feed auxiliary roller for driving the original sheet in the U-turn feed path to move on the reading sensor in intimate contact therewith, the original-sheet feed auxiliary roller being situated on the outer periphery of the U-turn feed path at a position corresponding to the reading sensor.

The contact-type reading sensor is so small that it can be easily set in a space surrounded by the U-turn feed path. The use of the original-sheet feed auxiliary roller improves the accuracy of the reading sensor in reading the image from the original sheet in the U-turn feed path. Moreover, the original-sheet feed auxiliary roller and its drive mechanism can be constructed with a compact design in a conventional manner.

A second object of the present invention is to obviate the necessity of all the installation spaces of the facsimile except that for the body cover.

This second object is achieved by forming an original-sheet inlet slot and an original-sheet outlet slot, for the U-turn feed path, and a recording-sheet outlet slot, in the upper surface of the body cover.

If an original-sheet supply tray, an original-sheet discharge tray, and a recording-sheet discharge tray are fitted on the top surface of the body cover to correspond to the original-sheet inlet slot, the original-sheet outlet slot, and the recording-sheet outlet slot, respectively, the original-sheet inlet slot, the original-sheet outlet slot and the recording-sheet outlet slot are preferably arranged parallel and at spaces from one another on the top surface of the body cover.

By arranging these slots in this manner, the area of the top surface of the body cover can be made relatively small.

In this case, if the original-sheet supply tray, the original-sheet discharge tray, and the recording-sheet discharge tray are mounted on the top surface of the body cover in a manner such that they are inclined in the same direction at the top surface of the body cover so as to extend parallel to one another, the mounting space required for these three trays over the body cover can be minimize.

A third object of the present invention is to achieve high-density arrangement of the recording-sheet storage space, image recording means, and reading sensor, inside the body cover, thereby reducing the capacity of the body cover.

This third object is achieved by defining a recording-sheet storage space to receive a rolled recording sheet in the center of the body cover, disposing the image recording means on one side of the recording-sheet storage space, inside the body cover, disposing an assembly of the reading sensor and the U-turn feed means on the other side of the recording-sheet storage space, inside the body cover, constructing the image recording means and the assembly of the reading sensor and the U-turn feed means so that they each have a height shorter than the maximum diameter of the rolled recording sheet in the recording-sheet storage space.

According to the arrangement described above, the dimension of the inside space of the body cover, with respect to a direction transverse to the longitudinal axis of the recording-sheet storage space, can be made smaller than in the aforementioned prior art case, and two regions of the top surface of the body cover corresponding individually to the image recording means and the assembly of the reading sensor and the U-turn feed means cannot project above that region of the top surface of the body cover corresponding to the recording-sheet storage space.

Since the height of the image recording means can be made much shorter than the respective heights of the recording-sheet storage space and the U-turn feed means, with its original-sheet inlet and outlet slots opening in the top surface of the body cover, a circuit board for an electric circuit of the facsimile can be disposed below the image recording means inside the body cover to be substantially parallel to the lower surface of the body cover. Thus, the inside space of the body cover can be effectively utilized, that is, the body cover can be made further compact.

If the recording-sheet storage space is located in the center of the inside space of the body cover, and if the image recording means and the assembly of the reading sensor and the U-turn feed means are arranged on either side of the storage space, the top surface of the body cover preferably includes two lids in the form of a French window, whereby the two regions corresponding to the image recording means and the assembly of the reading sensor and the U-turn feed means, along with the region corresponding to the recording-sheet storage space between them, are opened upward when the lids are swung up.

The two French-window-shaped lids facilitate the loading and unloading of the recording sheet into and from the recording-sheet storage space, and the inspection and maintenance of the image recording means and the assembly of the U-turn feed means and the reading sensor.

Preferably, the reading sensor and the turnabout roller of the U-turn feed means are attached to the lower surface of one of the French-window-shaped lids corresponding to the assembly.

Thereupon, the turnabout roller and the reading sensor are exposed to the outside space when the one lid is located in its open position, so that the inspection and maintenance of these elements and the U-turn feed path can be further facilitated.

A fourth object of the present invention is to provide an arrangement of the facsimile of the aforementioned type, whereby a recorded portion of the recording sheet, cut off from an unrecorded portion with use of cutter means, can be prevented from being curled up, due to residual stress or other causes, so that the next recorded portion of the recording sheet can be smoothly discharged from the recording-sheet outlet slot of the body cover.

This fourth object is achieved by providing, inside the body cover, a guide plate for guiding the recorded portion of the recording sheet, on which an image is recorded by means of the image recording means, discharged through the cutter means to the recording-sheet outlet slot in the top surface of the body cover, the cutter means being adapted to cut off the recorded portion of the recording sheet from the unrecorded portion thereof at the outlet of the image recording means, and by providing a cut end receiver at the cutter means or the inner end of the guide plate, to receive a cut end of the recorded portion at a position located below the cutting position of the cutter means.

The recorded portion of the recording sheet, cut out from the unrecorded portion by means of the cutter means, is put on the inclined guide plate in a manner such that its cut end is supported on the cut end receiver. By suitably adjusting the inclination of the guide plate, the recorded portion is prevented from being unduly curled up on the guide plate, due to the force of gravity applied to the recorded portion and a frictional force between the recorded portion and the guide plate.

If a region in the top surface of the body cover, corresponding to the image recording means and the recording-sheet storage space, is constructed by a lid capable of rocking upward to open, the guide plate is preferably inclined to extend over the recording-sheet storage space so that a lower end of the guide plate is within the space defined by the body cover and an upper end of the guide plate positioned in the vicinity of the top surface of the body cover, the guide plate being rockable around the upper end thereof between an open position, where the rolled recording sheet is allowed to be loaded into or removed from the storage space, and a closed position, where the rolled recording sheet is prevented from being loaded into or removed from the storage space.

Such an arrangement or construction of the guide plate inside the body cover does not constitute a hindrance to the effective utilization of the inside space of the body cover and the ease of loading and unloading of the recording sheet into and from the recording-sheet storage space.

Preferably, the guide plate has an upwardly convex portion curved along the outer surface of the rolled recording sheet in the storage space.

By doing this, the utilization of the inside space of the body cover is made more effective, and the recorded portion on the guide plate can better be prevented from curling.

DETAILED DESCRIPTION OF THE PREFERRED EMBODIMENT

Figure 1:
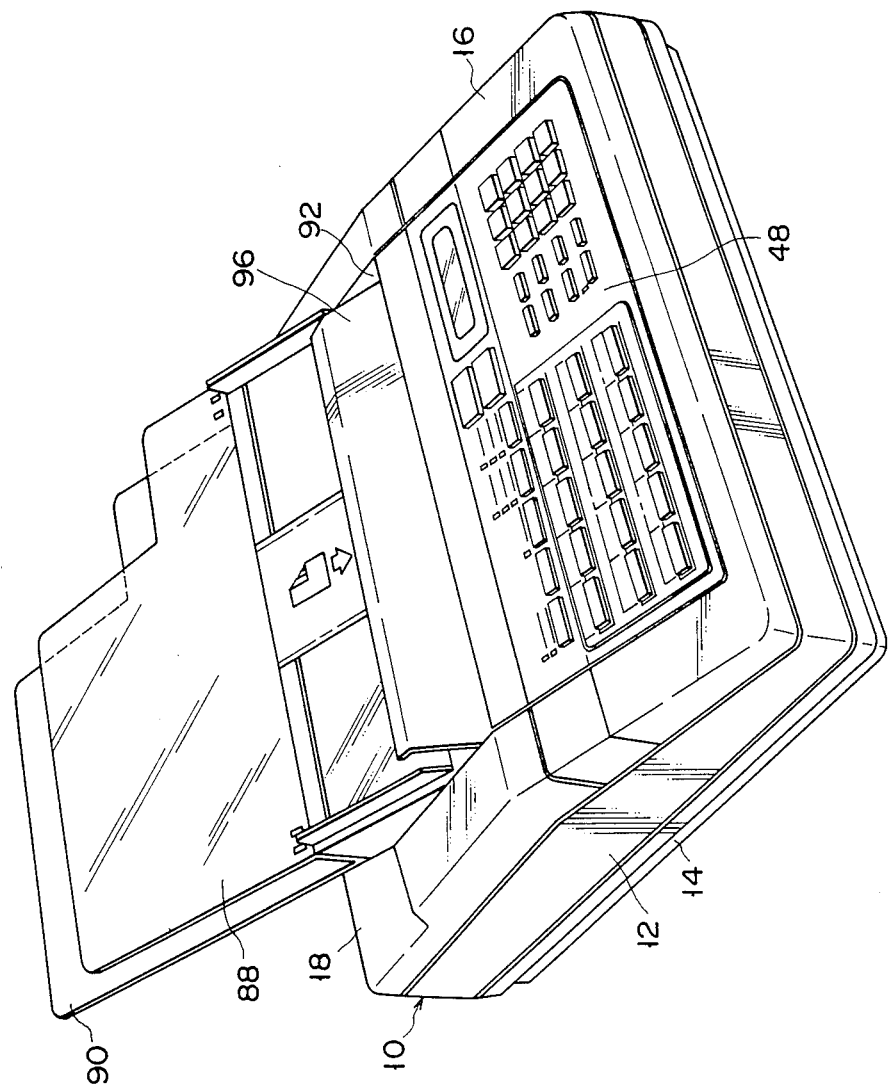
FIG. 1 is a perspective view schematically showing an outline of a facsimile according to an embodiment of the present invention.
Figure 2:
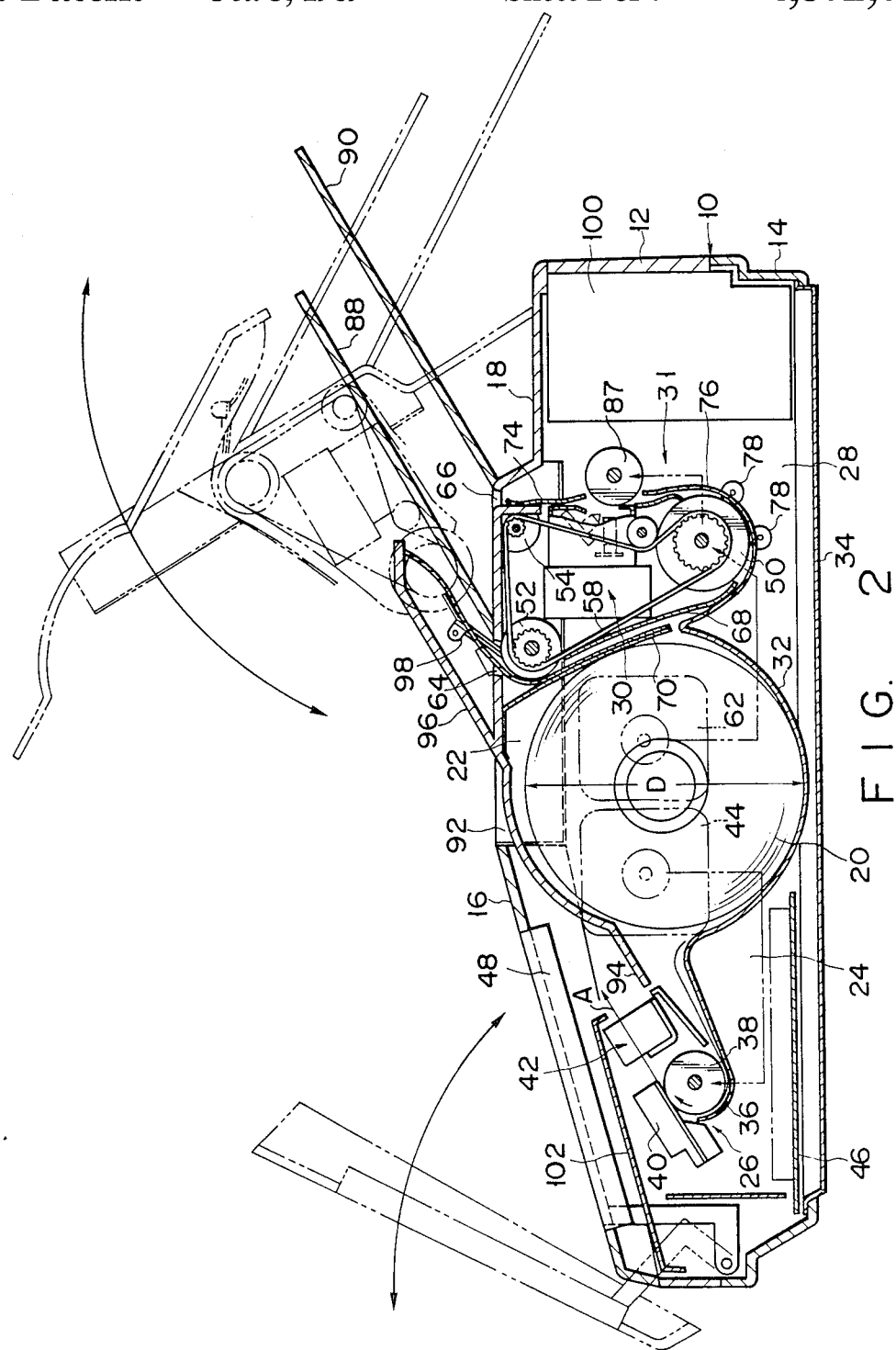
FIG. 2 is a vertical sectional view schematically showing the facsimile of FIG. 1.
Figure 3:
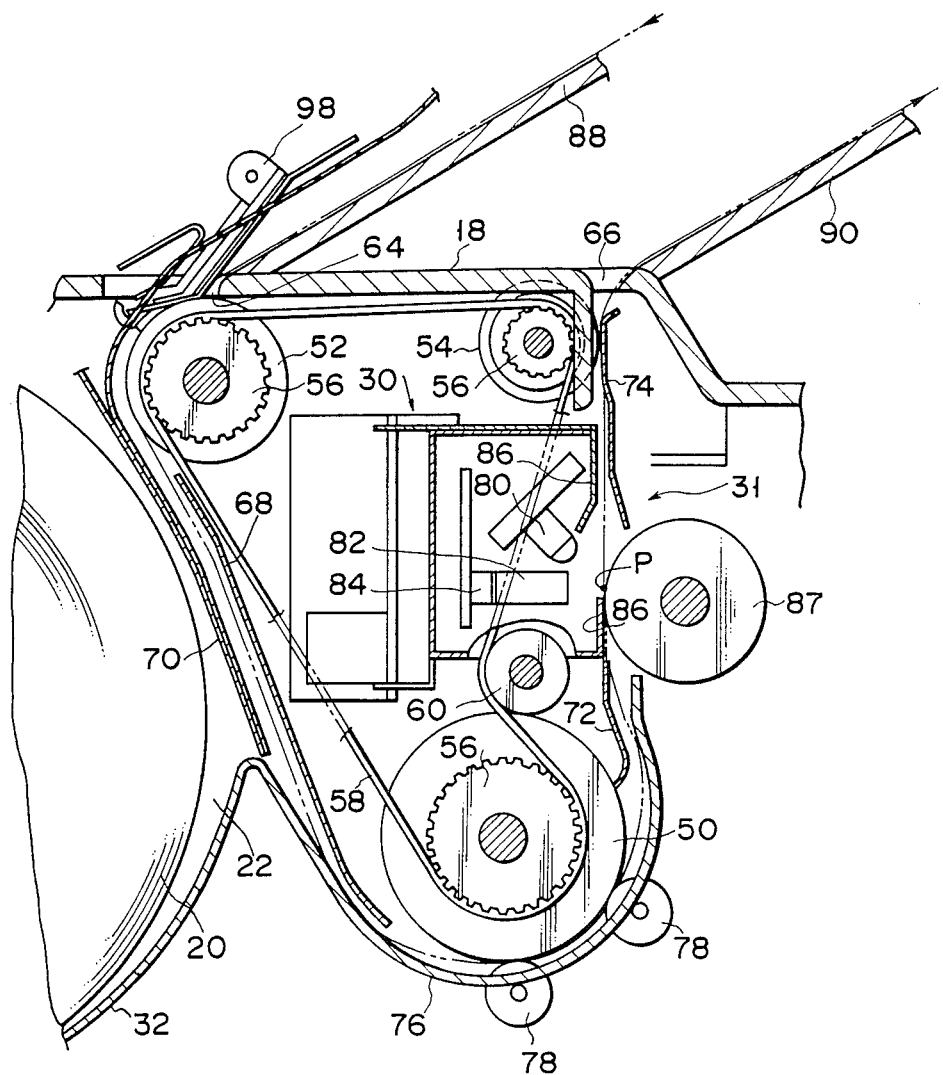
FIG. 3 is an enlarged vertical sectional view showing an assembly of a U-turn feed means and an image reading sensor for transporting an original sheet in the facsimile shown in FIG. 2 and for reading an image on the transported original sheet.

Referring now to FIGS. 1 to 3, a facsimile according to an embodiment of the present invention will be described in detail.

FIG. 1 shows an outline of the facsimile of the embodiment. Body cover 10 of the facsimile is constructed by upper and lower cover members 12 and 14 coupled to each other. The top surface of upper cover member 12 is constructed by front and rear lids 16 and 18 vertically swingable around the front and rear portions, respectively, of member 12. The boundary between front and rear lids 16 and 18 is positioned substantially in the center of upper cover member 12 with respect to its longitudinal direction. Cover members 12 and 14 can be securely stopped at their respective open positions by means of a conventional mechanism (not shown).

As shown in FIG. 2, recording-sheet storage recess 22 is defined in the central portion of the inside space of body cover 10, with respect to the longitudinal direction thereof. Recess 22 is adapted to receive rolled thermal recording sheet 20 which extends across the body cover. Image recording means 26 is disposed in front space region 24, which is positioned in front of recording-sheet storage recess 22 inside body cover 10. An assembly of image reading sensor 30 and U-turn feed means 31 is disposed in rear space region 28, which is positioned behind recess 22. Recording-sheet storage recess 22 is substantially equal in height to body cover 10. Thus, the bottom surface of arcuate sheet receiving plate 32 of recess 22 is located closely to bottom wall 34 of lower cover member 14 of body cover 10, so that even such a thin component as a circuit board cannot be interposed between plate 32 and wall 34.

Recording-sheet introducing guide plate 36 is formed integrally with recording-sheet receiving plate 32 to extend forwardly and decline from the front edge of plate 32, which is positioned at a half in height of recording-sheet storage recess 22. Platen roller 38 of image recording means 26 is located in the vicinity of the upper surface of an upwardly curved end of guide plate 36. Image recording means 26 further includes recording head 40, which is arranged to contact the top end of the peripheral surface of roller 38, and cutter means 42 disposed behind head 40. These components of image recording means 26 are attached on a body frame (not shown) which constitutes recording-sheet receiving plate 32 and recording-sheet introducing guide plate 36. The overall height of image recording means 26 is shorter than maximum diameter D of recording sheet 20 in recording-sheet storage recess 22.

At first, front and rear lids 16 and 18 are swung up like a French window, to take their respective open positions, as indicated by two-dot chain lines in FIG. 2. Then, rolled recording sheet 20 is set in recording-sheet storage recess 22, and its leading end is drawn out along recording-sheet introducing guide plate 36 to be inserted between platen roller 38 and recording head 40. When a reception mode or copy mode is established in the facsimile, platen roller 38 is rotated clockwise by platen drive motor 44 through a gear train (not shown). Motor 44 is mounted on the outer side surface of the body frame (not shown). The rotation of platen roller 38 causes the leading end of recording sheet 20 to move in the direction of arrow A along recording-sheet introducing guide plate 36. During this movement of the leading end, an image is recorded on the leading end by means of recording head 40. After the image recording is finished, cutter means 42 is operated to cut off a recorded portion of sheet 20 from an unrecorded portion thereof.

In front space region 24, circuit board 46 is disposed under image recording means 26 so as to extend along the inside surface of bottom wall 34 of lower cover member 14.

When front lid 16 is in its closed position, its top surface is forwardly declined, as indicated by solid line in FIG. 2. Keyboard 48 is mounted on the declined top surface of front lid 16. The forwardly declined keyboard 48 is easy to operate.

Image reading sensor 30 is particularly shown in detail in FIG. 3. It may be fixed on the body frame (not shown). In the present embodiment, however, sensor 30 is interposed between a pair of brackets (not shown), which are integrally formed on the underside surface of upper cover member 12 to protrude downward, and is supported by the brackets.

U-turn feed means 31 includes turnabout roller 50, pick-up roller 52, and exit roller 54. Turnabout roller 50 is interposed between the inner surfaces of the lower end portions of the paired brackets and is rotatably supported by the brackets. Pick-up roller 52 is interposed between the front end regions of the inner surfaces of the upper end portions of the paired brackets and is rotatably supported by the brackets. Likewise, exit roller 54 is interposed between the rear end regions of the inner surfaces of the upper end portions of the paired brackets and is rotatably supported by the brackets. Each one end of rotational center shafts for turnabout roller 50, pick-up roller 52, and exit roller 54 projects out from the outside surface of one bracket (not shown), and gear 56 is fixed the each one end. Timing belt 58 is passed around these gears 56, and is subjected to a proper amount of tension by means of a tension roller 60, which is positioned above turnabout roller 50 and is rotatably supported by the paired brackets. A rotatory force from an output shaft of a feed means drive motor 62 (see FIG. 2) mounted on the side surface of the body frame (not shown) is transmitted through conventional transmission means (not shown) to turnabout roller 50. The rotation of turnabout roller 50 causes pick-up roller 52 and exit roller 54 to rotate in the same direction therewith.

Original-sheet inlet slot 64 and original-sheet outlet slot 66 are formed in the top surface of rear lid 18 of upper cover member 12 to correspond to the rotational center shafts of pick-up roller 52 and exit roller 54, respectively. Slots 64 and 66 extend parallel to the corresponding rotational center shafts, that is, across the top surface of cover member 12.

U-turn feed means 31 further includes first and second inlet-side guide plates 68 and 70. First guide plate 68 is attached to the aforementioned paired brackets so as to extend between the outer ends of the outer peripheral surfaces of pick-up roller 52 and turnabout roller 50. Second plate 70 is attached to the underside surface of rear lid 18 so as to extend parallel to first plate 68. The upper end portion of second guide plate 70 is curved along the outer end of the outer peripheral surface of pick-up roller 52, and then projects outward from body cover 10 through original-sheet inlet slot 64. The projecting end of plate 70 extends diagonally upward and rearward, with respect to cover 10. Second inlet-side guide plate 70 covers the upper rear quarter portion of thermal recording sheet 20 stored in recording-sheet storage recess 22.

U-turn feed means 31 further includes first and second outlet-side guide plates 72 and 74. First plate 72 is attached to the aforementioned paired brackets so as to extend between the outer ends of the outer peripheral surfaces of exit roller 54 and turnabout roller 50. Second plate 74 is attached to the underside surface of rear lid 18 so as to extend parallel to first plate 72. The upper end portion of second plate 74, which faces exit roller 54, is bent so as to contact exit roller 54.

Furthermore, U-turn feed means 31 includes turnabout guide plate 76 and a plurality of bail rollers 78. Guide plate 76 extends from the rear end of recording-sheet receiving plate 32, which adjoins the lower end of second inlet-side guide plate 70, and is curved along the outer peripheral surface of turnabout roller 50. Bail rollers 78 are externally inserted into a plurality of openings formed at a plurality of positions in guide plate 76 so as to be in contact with turnabout roller 50. Rollers 78 are rotatably supported by the body frame (not shown).

In U-turn feed means 31 described above, an original sheet is picked up by pick-up roller 52 to be introduced through original-sheet inlet slot 64 formed in the top surface of body cover 10 into a guide path defined between first and second inlet-side guide plates 68 and 70. Then, the original sheet is transported along inlet-side guide plates 68 and 70 and turnabout guide plate 76 toward turnabout roller 50. Thereupon, the leading edge of the original sheet is pinched by turnabout roller 50 and bail rollers 78. Turnabout roller 50 feed the original sheet into the guide path defined between first and second outlet-side guide plates 72 and 74 to deliver it to exit roller 54. In order to discharge the original sheet to the outside of body cover 10 through original-sheet outlet slot 66 formed in the top surface of cover 10, exit roller 54, in conjunction with the upper-end contacting portion of guide plate 74, hold the leading edge of the original sheet.

In FIG. 3, a two-dot chain line indicates a path of transfer of the original sheet, extending from original-sheet inlet slot 64 to original-sheet outlet slot 66. This transfer path constitutes a U-turn feed path in U-turn feed means 31.

Image reading sensor 30 of the so-called contact type is disposed in the space surrounded by the aforesaid U-turn feed path. Sensor 30 is located between the paired brackets (not shown) and is supported by the brackets, thus constituting the assembly in conjunction with U-turn feed means 31. The height of this assembly is not greater than maximum diameter D of recording sheet 20 stored in recording sheet storage recess 22.

Image reading sensor 30 is formed by unifying lighting means array 80 such as an LED array, focusing means array 82 such as a self-focusing lens array, and photoelectric transducer array 84 such as a photodiode array. Each of these arrays extends substantially over the full width of the U-turn feed path, in the transverse direction of body cover 10. The front surface of unit case 86 of reading sensor 30 is positioned to be flush with second outlet-side guide plate 74. The original sheet slide on the front surface of case 86 while it is transported between turnabout roller 50 and exit roller 54, in the U-turn feed path.

Focusing point P of imaging means array 82 of image reading sensor 30 is located within an opening formed in the front surface of unit case 86 and is positioned on an imaginary plane which contains the opening.

Original-sheet auxiliary feed roller 87 is rotatably mounted on the body frame (not shown) so that part of the outer peripheral surface of roller 87 is positioned at imaging point P of focusing means array 82 of reading sensor 30. Auxiliary feed roller 87 is rotated in association with turnabout roller 50.

In image reading sensor 30, a light beam from lighting means array 80 is applied to the original sheet in the U-turn feed path, at imaging point P between turnabout roller 50 and exit roller 54. The light beam reflected on the original sheet at point P is focused on photoelectric transducer array 84, by focusing means array 82 to produce an image corresponding to an image on the original sheet at point P. The resulting image is converted into an electrical signal by transducer array 84.

As shown in detail in FIG. 2, original-sheet supply tray 88 and original-sheet discharge tray 90 are attached on the top surface of rear lid 18 of upper cover member 12 to correspond to original-sheet inlet and outlet slots 64 and 66, respectively. Trays 88 and 90 extend parallel to each other with a receding upward slope. The front edge of rear lid 18 of cover member 12 is separated at a predetermined distance from the rear edge of front lid 16 to define recording sheet outlet slot 92, which extends parallel to original-sheet inlet and outlet slots 64 and 66. Recording-sheet discharge guide plate 94 and recording-sheet discharge tray 96 are formed integrally with the front edge of rear lid 18. Guide plate 94 extends from the lower end of cutter means 42 located in body cover 12 to the region over the upper front quarter portion of recording sheet 20 stored in sheet storage recess 22. Tray 96 protrudes with a receding upward slope to be parallel to original-sheet supply and discharge trays 88 and 90. In this embodiment, the middle portion of recording-sheet discharge guide plate 94 is curved to correspond to the upper front quarter portion of recording sheet 20 in recess 22.

Original-sheet separating lever means 98 is rockably mounted on a portion of second inlet-side guide plate 70 which projects outward from original-sheet inlet slot 64. As shown in detail in FIG. 3, the free end of lever means 98 is positioned to be close to the peripheral surfaces of pick-up roller 52. Also, lever means 98 is urged by a spring (not shown) so that a rubber pad attached to the backside surface of its free end is in contact with the peripheral surface of pick-up roller 52. In conjunction with pick-up roller 52, lever means 98 constitutes an original-sheet separation mechanism for preventing original sheets from being picked up in a superposed state. Thus, only the lowermost original sheet in a pile of original sheets placed on original-sheet supply tray 88, can be fed into the U-turn feed path.

In rear space region 28 inside body cover 10, moreover, power supply unit 100 is disposed behind the assembly of U-turn feed means 31 and image reading sensor 30. In front space region 24, removable guard board 102 extends over recording head 40 and cutter means 42 to cover the same.

It is to be understood that various other sensors are arranged inside body cover 10. These sensors include, for example, a sensor for detecting the leading and back ends of recording sheet 20 at recording head 40, a sensor for detecting the positions of front and rear lids 16 and 18, and a sensor for detecting the supply and discharge of original sheet at original-sheet inlet and outlet slots 64 and 66.

Referring now to FIGS. 4 to 8, a modification of the aforementioned embodiment will be described. In connection with this modification, like reference numerals are used to designate the same elements as are included in the above embodiment, and a detailed description of those elements is omitted.

In this modification, the extended end portion of recording-sheet introducing guide plate 36 is not upwardly curved along the outer peripheral surface of platen roller 38. Bumper plate 104, which is rotatably suspended from the rotational center shaft of roller 38, is used in place of the upwardly curved end portion of the above described embodiments.

In this modification, moreover, recording-sheet discharge guide plate 94 and a part of recording-sheet discharge tray 96 are not formed integrally with the front edge of rear lid 18.

Recording-sheet discharge guide plate 94 has pivot pin 106 at the rear or upper end of each side edge thereof. Paired pivot pins 106 are fitted in a pair of pivot holes 114 which are formed in the upper ends of inside surfaces of side walls 110 and 112 of body frame 108, as shown in detail in FIG. 6. Side walls 110 and 112 corresponds to recording-sheet storage recess 22. Handle projection 116 is formed on one side edge of guide plate 94 which is independent of rear lid 18. Handle projection 116 is used for manual operation of guide plate 94.

Figure 4:
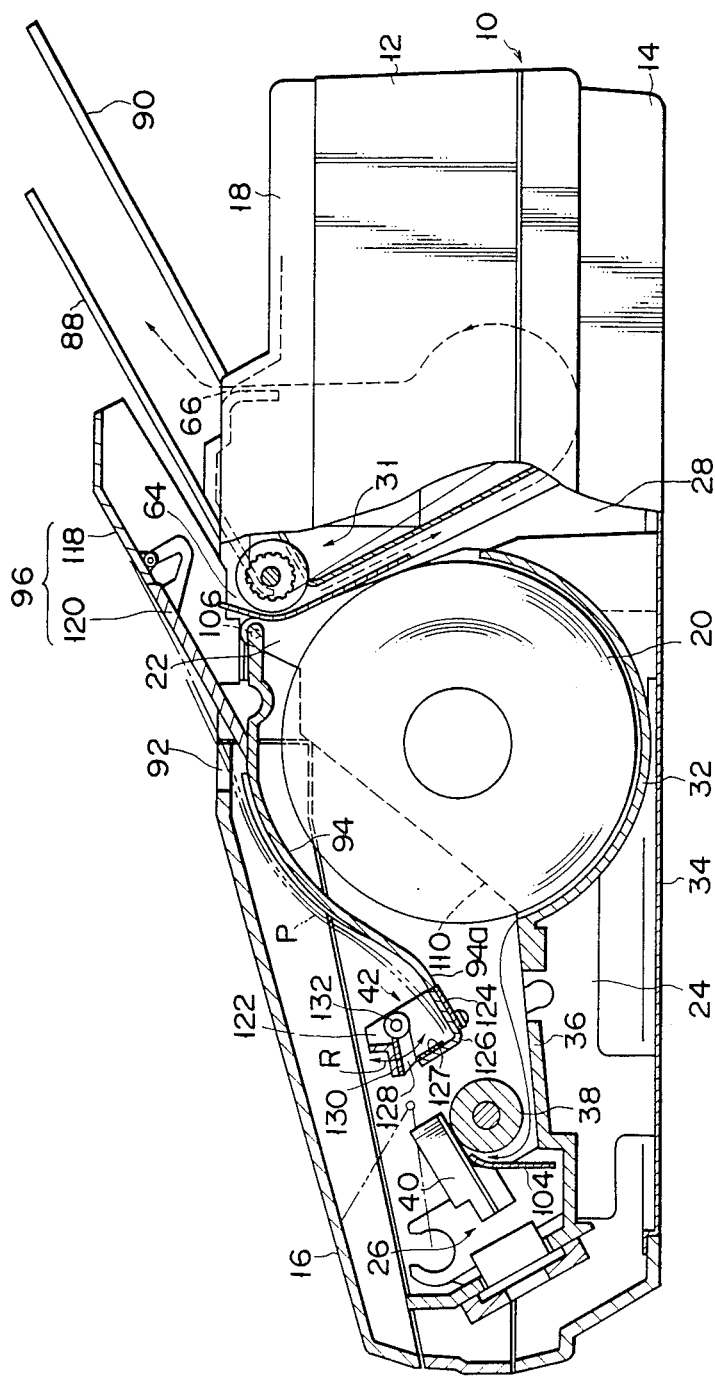
FIG. 4 is a side view, partially in section, schematically showing a modification of the embodiment of the invention.

Only upper half portion 118 of recording-sheet discharge tray 96 is fixed on rear lid 18, and lower half portion 120 thereof is attached to the back side surface of the lower end of the upper half portion 118 so as to be vertically rockable, as shown in FIG. 4. When recording-sheet discharge guide plate 94 is in its closed position, as shown in FIG. 4, lower half portion 120 abuts against guide plate 94 and is positioned on the extension of upper half portion 118.

Figure 7:
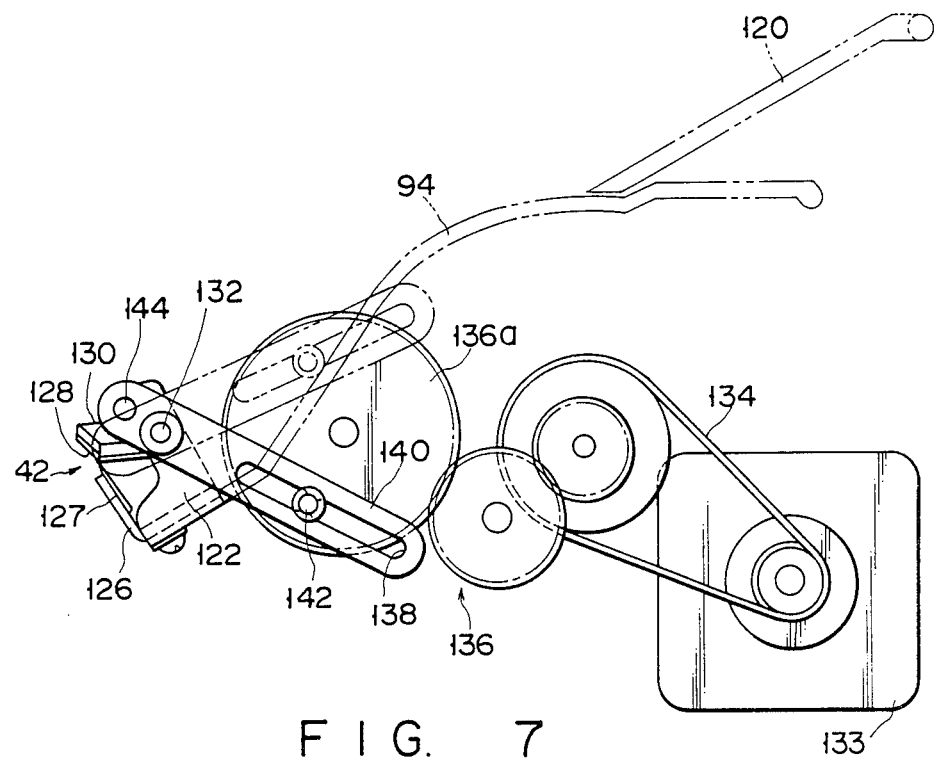
FIG. 7 is a side view schematically showing a cutter means drive mechanism used in the modification of FIG. 4.

As shown in FIGS. 4 to 8, cutter means 42 includes elongate base plate 124 which is bent at both ends to form a pair of erected-end plate portions 122. An L-shaped sheet receiver 126 is fixed to the upper surface of base plate 124 so as to be positioned between erected-end plate portions 122. Fixed cutting blade 127 is attached to the side surface of a rising portion of sheet receiver 126. The blade 127 is substantially as long as receiver 126 and projects above the upper end of the rising portion. Elongate movable blade holder plate 130 is located between the upper ends of erected-end plate portions 122. Movable cutting blade 128 is attached to holder plate 130 and is substantially as long as fixed blade 127. Plate 130 is rockably supported on erected-end plate portions 122 by a pair of pivots 132 to be inclined at an angle to the horizontal upper edge of fixed blade 127. Blade holder plate 130 is rocked alternatingly in the direction designated by double-headed arrow R in FIG. 4 by a cutter means drive mechanism, which will be mentioned later. Thus, the recording sheet, passed between fixed and movable cutting blades 127 and 128, is cut crosswise. As shown in FIGS. 4 and 7, a horizontally extending portion of recording-sheet receiver 126 is positioned on the extension of front or lower end 94a of recording-sheet discharge guide plate 94 located in its closed position.

As shown in FIG. 7, the cutter means drive mechanism includes gear train 136, swing lever 140, and engaging pin 142. The driving force of cutter drive motor 133, which is mounted on one side wall 110 (FIG. 6) of the body frame, is transmitted to gear train 136 by means of timing belt 134. Slot 138 is formed in one end portion of swing lever 140 which is pivotally mounted on one pivot 132 for movable blade holder plate 130. Engaging pin 142 is fixed on the lateral surface of final gear 136a in gear train 136 so as to be fitted in slot 138 of swing lever 140. The other end of lever 140 is coupled to the lateral surface of movable blade holder plate 130 by means of pivot pin 144.

Figure 8:
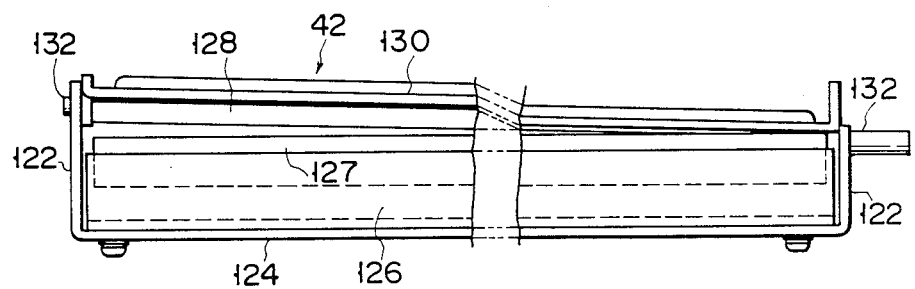
FIG. 8 is a front view schematically showing the cutter means used in the modification of FIG. 4.

When final gear 136a of gear train 136 rotates in one direction, engaging pin 142 causes swing lever 140 to swing around one pivot 132 between two positions indicated by solid line and two-dot chain line in FIG. 7. Thereupon, lever 140 causes movable blade holder plate 130 to rock alternatingly, as indicated by arrow R in FIG. 4, through pin 144. When cutter means 42 is not used, movable blade holder plate 130 is held in a position where movable blade 128 is positioned above fixed cutting blade 127, as shown in FIGS. 4, 7 and 8, to allow the leading end portion of the recording sheet 20 to pass between fixed and movable cutting blades 127 and 128.

Figure 5:
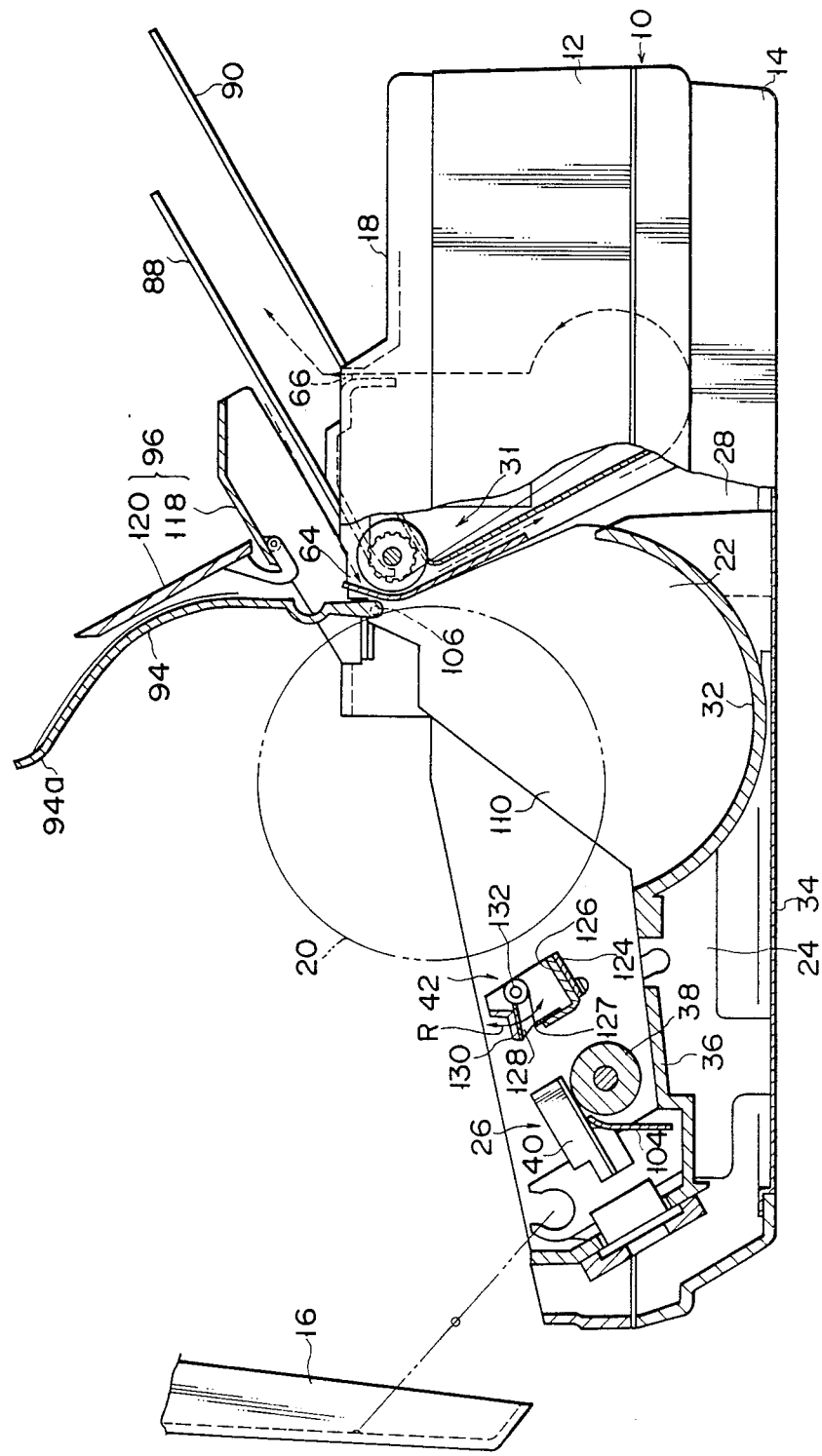
FIG. 5 is a side view, partially in section, schematically showing the modification of FIG. 4, in a state that a recording sheet can be loaded into or unloaded from a recording-sheet storage recess.
Figure 6:
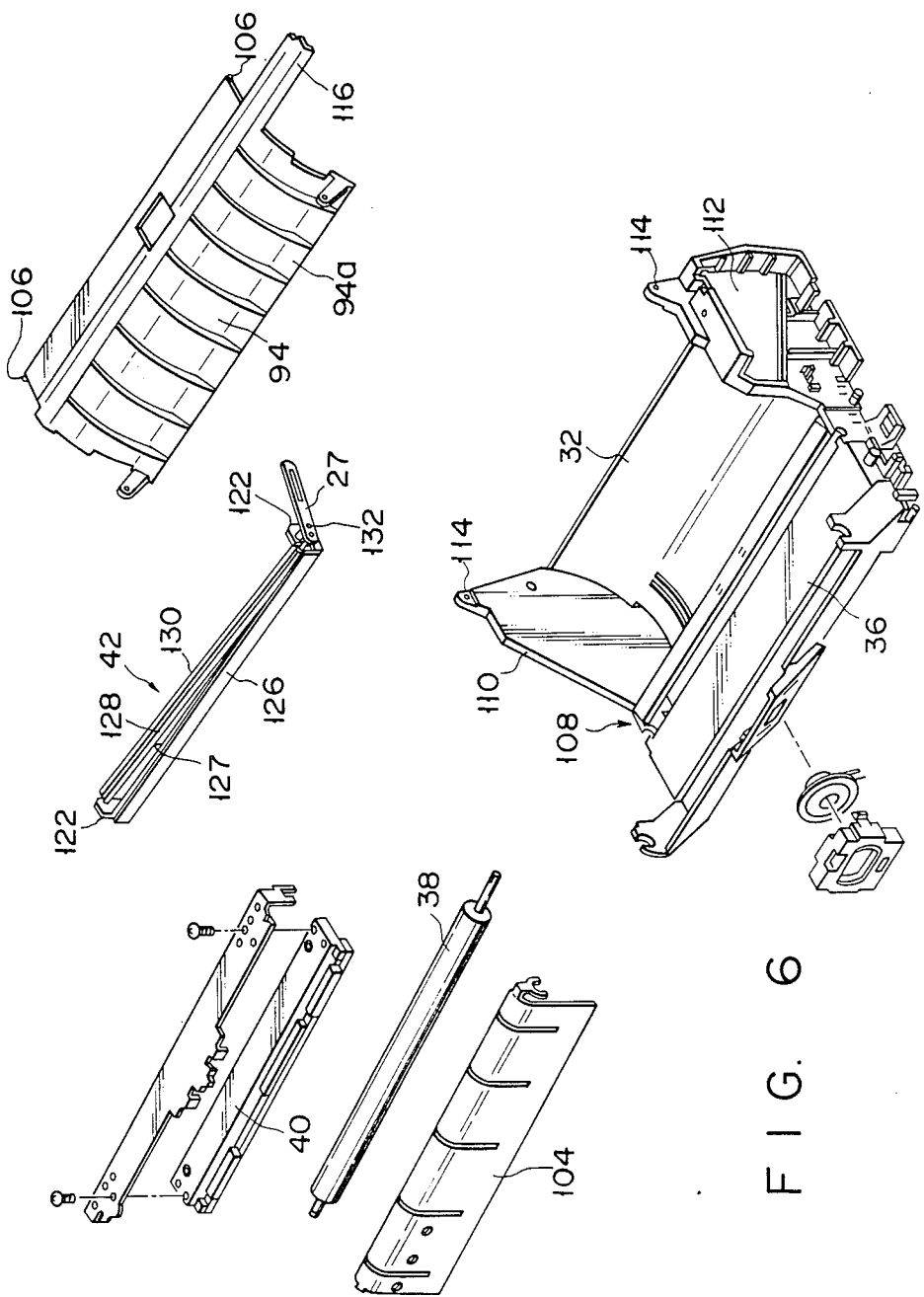
FIG. 6 is an exploded perspective view schematically showing image recording means, cutter means, and a portion of a body frame to define the recording-sheet storage recess, those of which being used in the modification of FIG. 4.

In setting rolled recording sheet 20 into recording-sheet storage recess 22 of the modification of the facsimile constructed as described above, front lid 16 is first pulled up to be rocked from the closed position shown in FIG. 4 to the open position shown in FIG. 5. Then, recording-sheet discharge guide plate 94 is lifted rearward to its open position, as shown in FIG. 5. Thereupon, lower half portion 120 of recording-sheet discharge tray 96, along with guide plate 94, is rocked to its open position. In this state, rolled recording sheet 20 can be dropped onto recording-sheet receiving plate 32 which defines recording-sheet storage space 22. The leading edge of recording-sheet 20 on plate 32 is drawn out along recording-sheet introducing guide plate 36 so that it is pinched by platen roller 38 and recording head 40. Finally, recording-sheet discharge guide plate 94 and front lid 16 are rocked successively to their respective closed positions, whereupon the setting of recording sheet 20 in the facsimile of the aforementioned modification is completed. This state is shown in FIG. 4.

When the reception mode or the copy mode is established in the modified facsimile in which rolled recording sheet 20 is loaded as described above, platen roller 38 rotates to move the leading end portion of sheet 20 on recording head 40. In response to a received signal, head 40 records an image on the leading end portion of the traveling recording sheet 20.

Since free end or lower end 94a of recording-sheet discharge guide plate 94, disposed in the exit side of cutter means 42, is positioned below the cutting position of cutter means 42, i.e., below the top edge of fixed cutting blade 127, so the leading end portion of recording sheet 20 which has passed through the gap between fixed and movable cutting blades 127 and 128 of cutter means 42, cannot be caught by end 94a of guide plate 94.

After passing through cutter means 42, the leading end portion or recorded portion of recording sheet 20 moves diagonally upward along the upper surface of recording-sheet discharge guide plate 94. In order to permit the recorded portion to be removed from the guide plate 94, the leading edge of the recorded portion is discharged through recording-sheet outlet slot 92 onto recording-sheet discharge tray 96. Owing to the force of gravity and frictional force produced between the recorded portion and guide plate 94 and discharge tray 96, the recorded portion placed on guide plate 94 and discharge tray 96 is prevented from being curled up too much, despite existence of the residual stress attributable to the rolled configuration for the storage.

When recording for a predetermined length corresponding to the received signal is finished, cutter means 42 is operated to cut out the recorded portion of recording sheet 20 from the unrecorded portion thereof. The cut end or lower end of separated recorded portion P (see FIG. 4) is dropped from the top edge of fixed cutting blade 127 onto the horizontally extending portion of sheet receiver 126. Thus, cut recorded portion P is held along the upper surfaces of recording-sheet discharge guide plate 94 and recording-sheet discharge tray 96 with its cut end abutting against the rising portion of receiver 126.

If cut recorded portion P is short, its liability to curling by the aforesaid residual stress increases. This tendency can, however, be effectively restrained by the upward bulge of the curved portion of recording-sheet discharge guide plate 94.

The cut end or lower end of recorded portion P, which is supported on the horizontal portion of sheet receiver 126, is held below the top edge of fixed cutting blade 127, so that the cut end of recorded portion P cannot be cut twice by cutter means 42.

What is claimed is:
1. A facsimile comprising:
 a body cover shaped to define a space therein;
 U-turn feed means contained in the space defined by the body cover and having a turnabout roller for changing an original-sheet feed direction;
 a reading sensor in the space defined by the body cover to read an image on an original sheet transported in the U-turn feed means; and
 image recording means in the space defined by the body cover to record an image on a recording sheet,
 said reading sensor being situated at a position within a space surrounded by a U-turn feed path in the U-turn feed means such that said reading sensor cannot interfere with the turnabout roller.

2. The facsimile according to claim 1, wherein said reading sensor is of a contact-type reading sensor adapted to read the image on the original sheet by coming into intimate contact with the original sheet being transported through the U-turn feed path, and said facsimile further comprises an original-sheet feed auxiliary roller for driving the original sheet in the U-turn feed path to move on the reading sensor in intimate contact therewith, said original-sheet feed auxiliary roller being situated on the outer periphery of the U-turn feed path at a position corresponding to the reading sensor.

3. The facsimile according to claim 1, wherein an original-sheet inlet slot and an original-sheet outlet slot, for the U-turn feed path, and a recording-sheet outlet slot are formed in the upper surface of said body cover.

4. The facsimile according to claim 3, wherein said original-sheet inlet slot, said original-sheet outlet slot, and said recording-sheet outlet slot are arranged parallel and at spaces from one another on the top surface of the body cover, and an original-sheet supply tray, an original-sheet discharge tray, and a recording-sheet discharge tray are attached to the top surface of said body cover to correspond to the original-sheet inlet slot, the original-sheet outlet slot, and the recording-sheet outlet slot, respectively.

5. The facsimile according to claim 4, wherein said original-sheet supply tray, said original-sheet discharge tray, and said recording-sheet discharge tray are inclined in the same direction at the top surface of the body cover so as to extend parallel to one another.

6. The facsimile according to claim 1, wherein a recording-sheet storage space to receive a rolled recording sheet is defined in the center of said body cover; said image recording means is disposed on one side of the recording-sheet storage space, within the space defined by the body cover; an assembly of said reading sensor and said U-turn feed means is disposed on the other side of the recording-sheet storage space, within the space defined by the body cover; said image recording means and said assembly of said reading sensor and said U-turn feed means are constructed so that they each have a height shorter than the maximum diameter of the rolled recording sheet in the recording-sheet storage space; and two regions of the top surface of said body cover corresponding individually to the image recording means and the assembly of the reading sensor and the U-turn feed means do not project above that region of the top surface of the body cover corresponding to the recording-sheet storage space.

7. The facsimile according to claim 6, wherein a circuit board for an electric circuit of said facsimile is disposed below the image recording means within the space defined by the body cover to be substantially parallel to the lower surface of the body cover.

8. The facsimile according to claim 6, wherein the top surface of said body cover includes two lids in the form of a French window, whereby the two regions corresponding to the image recording means and the assembly of the reading sensor and the U-turn feed means, along with the region corresponding to the recording-sheet storage space between them, are opened upward when the lids are swung up.

9. The facsimile according to claim 8, wherein said reading sensor and said turnabout roller of said U-turn feed mans are attached to the lower surface of one of said French-window-shaped lids corresponding to the assembly, so that the turnabout roller and the reading sensor are exposed to the outside space when said one lid is located in its open position.

10. The facsimile according to claim 6, wherein an original-sheet inlet slot and an original-sheet outlet slot both of which are for the U-turn feed path, and a recording-sheet outlet slot are formed in the top surface of said body cover.

11. The facsimile according to claim 10, wherein said original-sheet inlet slot, said original-sheet outlet slot, and said recording-sheet outlet slot are arranged parallel and at spaces from one another on the top surface of the body cover, and an original-sheet supply tray, an original-sheet discharge tray, and a recording-sheet discharge tray are attached to the top surface of said body cover to correspond to said original-sheet inlet slot, said original-sheet outlet slot, and said recording-sheet outlet slot, respectively.

12. The facsimile according to claim 11, wherein said original-sheet supply tray, said original-sheet discharge tray, and said recording-sheet discharge tray are inclined in the same direction at the top surface of the body cover so as to extend parallel to one another.

13. The facsimile according to claim 10, further comprising a guide plate located in the space defined by said body cover to guide a recorded portion of the recording sheet, on which an image is recorded by means of the image recording means, to the recording-sheet outlet slot, and cutter means located in the space defined by said body cover to cut out the recorded portion thereof at the outlet of the image recording means, and a cut end receiver provided on said guide plate or said cutter means to receive a cut end of the record portion at a position located below the cutting position of the cutter means.

14. The facsimile according to claim 13, wherein a region in the top surface of said body cover, corresponding to the image recording means and the recording-sheet storage space, is constructed by a lid capable of rocking upward to open, and said guide plate is inclined to extend over the recording-sheet storage space so that a lower end of the guide plate is within the space defined by the body cover and an upper end of the guide plate is positioned in the vicinity of the top surface of the body cover, the guide plate being rockable around the upper end thereof between an open position, where the rolled recording sheet is allowed to be loaded into or removed from the storage space, and a closed position, where the rolled recording sheet is prevented from being loaded into or removed from the storage space.

15. The facsimile according to claim 14, wherein said guide plate has an upwardly convex portion curved along the outer surface of the rolled recording sheet in the storage space.

* * * * *